United States Patent [19]

Watanabe et al.

[11] Patent Number: 4,469,339
[45] Date of Patent: Sep. 4, 1984

[54] FUEL TANK CONSTRUCTION OF MOTOR VEHICLE

[75] Inventors: Hiroyuki Watanabe; Yasushi Tanaka, both of Toyota, Japan

[73] Assignee: Toyota Jidosha Kogyo Kabushiki Kaisha, Aichi, Japan

[21] Appl. No.: 388,426

[22] Filed: Jun. 14, 1982

[30] Foreign Application Priority Data

Jun. 12, 1981 [JP] Japan .............................. 56-86606[U]

[51] Int. Cl.³ ............................................. B60K 15/04
[52] U.S. Cl. .................................................... 280/5 A
[58] Field of Search ............... 280/5 R, 5 A; 296/204, 296/208; 180/89.1

[56] References Cited

U.S. PATENT DOCUMENTS

| | | | |
|---|---|---|---|
| 3,014,730 | 12/1961 | Cole | 280/5 A |
| 3,285,359 | 11/1966 | Weeks et al. | 280/5 A |
| 4,283,067 | 8/1981 | Weber | 280/5 A |

Primary Examiner—John A. Pekar
Attorney, Agent, or Firm—Parkhurst & Oliff

[57] ABSTRACT

A fuel tank construction of a motor vehicle, wherein: a tunnel upwardly projecting from the surface of a floor panel, connected at the rear end thereof to a back panel and disposed in the longitudinal direction of the vehicle is formed at the central portion in the widthwise direction of the floor panel and a fuel tank is disposed in the tunnel; and the construction comprises a through-hole formed in the back panel at a position corresponding to an upper portion of an internal of the tunnel, a cross member forming a closed cross-section in the widthwise direction of the vehicle cooperation with the back panel at a position downwardly of the through-hole, an inlet pipe on the tank's side connected to the fuel tank, passing through said through-hole of the back panel and reaching a position upwardly of the cross member, and further, bent outwardly in the widthwise direction of the vehicle along the upper surface of the cross member, and a hose disposed upwardly of the cross member and connecting the inlet pipe on the tank's side to an inlet pipe on the body's side.

4 Claims, 3 Drawing Figures

FUEL TANK CONSTRUCTION OF MOTOR VEHICLE

BACKGROUND OF THE INVENTION

1. Field of the Invention

This invention relates to a fuel tank construction of a motor vehicle, and more particularly to a fuel tank construction of a motor vehicle, wherein a tunnel projecting from the surface of a floor panel, connected at the rear end thereof to a back panel and disposed in the longitudinal direction of the vehicle is formed at the central portion in the widthwise direction of the floor panel, and a fuel tank is disposed in the tunnel.

2. Description of the Prior Art

In general, in a motor vehicle, particularly, a passenger vehicle, a fuel tank has been disposed at the back of seats located at the rear end of a space occupied by occupants, whereby there have been imposed limits on the utilization of a space in the rear portion of the vehicle by the space occupied by the fuel tank.

To solve the above-described problems, it is conceivable that, in a rear engine—rear wheel drive type motor vehicle, a front engine—front wheel drive type motor vehicle or the like, in which a propeller shaft does not longitudinally traverse the undersurface of the central portion in the widthwise direction of the floor panel therebeneath, a tunnel upwardly projecting from the surface of a floor panel and disposed in the longitudinal direction of the vehicle is formed at the central portion in the widthwise direction of the floor panel, and a fuel tank is disposed in the tunnel, so that effective utilization of the space in the rear portion of the vehicle can be enhanced and a further reduced total length of the vehicle and decreased weight of the vehicle can be attained.

In the case of the motor vehicle of the type described, the fuel tank is adapted to be disposed at the lower portion of the center of the vehicle, thereby presenting the problems that construction of connecting an inlet pipe on the tank's side of a fuel tank to an inlet pipe on the body's side having a fuel pour-in port projecting to the outside of the vehicle body and connecting work become complicated, and construction of holding an inlet hose connecting the both members matters.

SUMMARY OF THE INVENTION

The present invention has been developed in view of the above-described problems and has as its object the provision of a fuel tank construction of a motor vehicle, wherein construction of connecting the inlet pipe on the tank's side to the inlet pipe on the body's side and connecting work are simplified, and a dead space in the rear portion of the vehicle is effectively utilized.

To achieve the above-described object, according to the present invention: a tunnel upwardly projecting from the surface of a floor panel, connected at the rear end thereof to a back panel and disposed in the longitudinal direction of the vehicle is formed at the central portion in the widthwise direction of the floor panel and a fuel tank is disposed in the tunnel; and the construction comprises a through-hole formed in the back panel at a position corresponding to an upper portion of an internal space of the tunnel, a cross member forming a closed cross-section in the widthwise direction of the vehicle with the back panel at a position downwardly of the through-hole, a tank's side inlet pipe connected to the fuel tank, passing through the through-hole of the back panel and reaching a position upwardly of the cross member, and further, bent outwardly in the widthwise direction of the vehicle along the upper surface of the cross member, and a hose disposed upwardly of the cross member and connecting the tank's side inlet pipe to a body's side inlet pipe having a fuel-pour port.

Further, to achieve the above-described object, according to, the present invention, in the aforesaid fuel tank construction of a motor vehicle, the through-hole formed in the back panel is made to be a slot elongate in the widthwise direction of the vehicle.

Further, to achieve the above-described object, according to the present invention, in the aforesaid fuel tank construction of a motor vehicle, the inner end portion of the body's side inlet pipe is disposed at a position upwardly of the cross member.

Further, to achieve the above-described object, according to the present invention, in the aforesaid fuel tank construction of a motor vehicle, the end portions of the tank's side inlet pipe and the body's side inlet pipe and the inlet hose are supported, being spaced upwardly apart from the cross member.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
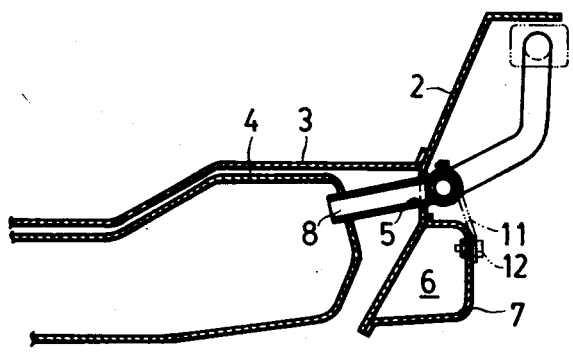
FIG. 1 is a sectional view showing the essential portions of the embodiment of the fuel tank construction of the motor vehicle according to the present invention.
Figure 2:
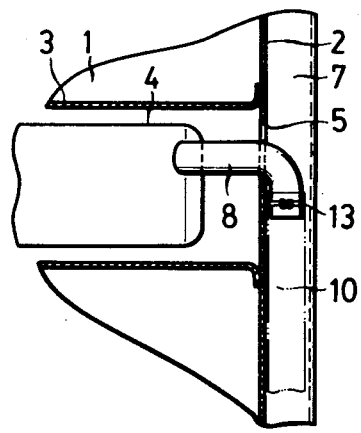
FIG. 2 is a plan view thereof.
Figure 3:
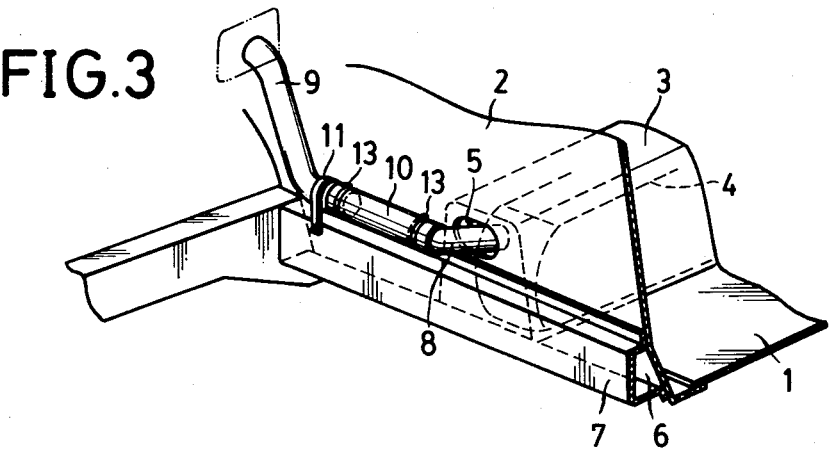
FIG. 3 is a perspective view thereof.

Detailed description will hereunder be given of the embodiments of the present invention with reference to the drawings.

As shown in the drawings, in this embodiment, a tunnel 3 upwardly projecting from the surface of a floor panel 1, connected at the rear end thereof to a back panel 2 and disposed in the longitudinal direction of the vehicle is formed at the central portion in the widthwise direction of the floor panel 1 and a fuel tank 4 is disposed in the tunnel 3; and the construction comprises a through-hole 5 formed in the back panel 2 at a position corresponding to an upper portion of an internal space of the tunnel 3, a cross member 7 forming a closed cross-section 6 in the widthwise direction of the vehicle in cooperation with the back panel at a position downwardly of the through-hole 5, a tank's side inlet pipe 8 connected to the fuel tank 4, passing through the through-hole 5 of the back panel 2 and reaching a position upwardly of the cross member 7, and further, bent outwardly in the widthwise direction of the vehicle along the upper surface of the cross member 7, and an inlet hose 10 disposed upwardly of the cross member and connecting the tank's side inlet pipe 8 to a body's side inlet pipe 9.

The aforesaid through-hole 5 formed in the back panel 2 is a slot disposed in widthwise direction of the vehicle and adapted to receive therein the aforesaid tank'side inlet pipe 8 and facilitate the positioning.

The aforesaid body's side inlet pipe 9 is provided at an outer end thereof with a fuel pour-in port, not shown, having an opening to the outside of the vehicle body, and cantilever-supported at an inner end portion thereof by a clamp 11 at a position upwardly of the aforesaid cross member 7 in a state of being separated from the top surface of the cross member 7, as shown in the drawing. Reference numeral 12 in the drawing indicates a bolt for securing the clamp 11 to the cross member 7.

The aforesaid inlet hose 10 is coupled at opposite ends thereof to the aforesaid tank's side inlet pipe 8 and an end opening opposed thereto of the body's side inlet pipe 9, and tightened and affixed to the both members by means of bands 13.

This embodiment can offer the advantages that work of connecting the tank's side inlet pipe to the the body's side inlet pipe is facilitated and a useless rearward protrusion of the tank's side inlet pipe is eliminated.

In addition, in the above-described embodiment, the inlet hose 10 and the inlet pipes 8, 9 connected to the opposite ends of the inlet hose 10 are disposed at positions upwardly of the cross member 7, being separated therefrom, however, these members may be replaced ones disposed in a dead space upwardly of the cross member 7, and consequently, these members may be closely attachedly secured to the top surface of the cross member 7 provided that a relative displacement between these members and the cross member 7 can be satisfactorily absorbed, or such a relative displacement therebetween does not affect these members.

It should be apparent of those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A motor vehicle fuel tank structure comprising:
   a motor vehicle floor panel having a length and width and configured to have a tunnel extending the length of the floor panel at a position substantially in the center of said width, said tunnel having an upper portion extending above the floor panel and said floor panel normally positioned to have its width and length span a width and length of a vehicle, respectively;
   a vehicle back panel coupled to said floor panel and having an opening communicating with the upper portion of said tunnel;
   a cross member extending along the width of said floor panel adjacent to said back panel at a position below said opening;
   a fuel tank disposed in said tunnel and having an inlet pipe extending from said tunnel through said opening and shaped to extend a distance above said cross member;
   a fuel inlet pipe generally positioned in the side of a vehicle; and
   a hose coupled between said fuel inlet pipe and the inlet pipe of said fuel tank.

2. The fuel tank structure of claim 1 wherein said opening is an elongate slot having a length generally parallel to the width of said floor panel.

3. The fuel tank structure of claims 1 or 2 wherein said fuel inlet pipe has an end portion disposed above said cross member.

4. The fuel tank structure of claim 3 wherein said inlet pipe of the fuel tank has an end portion and said hose is coupled between the fuel tank inlet pipe end portion and the fuel inlet pipe end portion and further wherein said end portions and hose are disposed above and spaced from said cross member.

* * * * *